United States Patent [19]
Marian et al.

[11] Patent Number: 5,797,848
[45] Date of Patent: Aug. 25, 1998

[54] ULTRASONIC TRANSDUCER ASSEMBLY WITH IMPROVED ELECTRICAL INTERFACE

[75] Inventors: Vaughn R. Marian, Saratoga, Calif.; Michael G. Curley, Cambridge, Mass.

[73] Assignee: Acuson Corporation, Mountain View, Calif.

[21] Appl. No.: 792,291

[22] Filed: Jan. 31, 1997

[51] Int. Cl.⁶ ........................................................ A61B 8/12
[52] U.S. Cl. ............................................. 600/459; 600/463
[58] Field of Search ........................... 600/459, 462, 600/463, 466; 439/729

[56] References Cited

U.S. PATENT DOCUMENTS

| | | |
|---|---|---|
| 3,701,071 | 10/1972 | Landman . |
| 4,034,744 | 7/1977 | Goldberg ............................. 600/445 |
| 4,193,965 | 3/1980 | Cullingford et al. . |
| 4,647,131 | 3/1987 | Van Woensel . |
| 4,708,661 | 11/1987 | Morland et al. . |
| 4,748,985 | 6/1988 | Nagasaki ............................. 600/459 X |
| 4,794,931 | 1/1989 | Yock . |
| 4,824,379 | 4/1989 | Roberts et al. . |
| 5,130,499 | 7/1992 | Dijkshoorn . |
| 5,199,882 | 4/1993 | Bates et al. . |
| 5,309,316 | 5/1994 | Yagi et al. . |
| 5,368,037 | 11/1994 | Eberle et al. . |
| 5,373,109 | 12/1994 | Argyrakis et al. . |
| 5,398,689 | 3/1995 | Connor et al. . |
| 5,403,202 | 4/1995 | Roehling . |
| 5,413,508 | 5/1995 | Obara ................................ 600/462 X |
| 5,414,220 | 5/1995 | Hanafo et al. . |
| 5,418,691 | 5/1995 | Tokura . |
| 5,451,169 | 9/1995 | Corbett, III et al. . |
| 5,552,565 | 9/1996 | Cartier et al. . |
| 5,634,464 | 6/1997 | Jang et al. ............................. 600/459 |

OTHER PUBLICATIONS

Specification of "Modular Transducer System", Serial No. 08/584,332 filed Jan. 5, 1996, Inventor: Vaughn R. Marian, Jr.

Specification of "Submersible Connector System", Serial No. 08/538,870 filed Oct. 4, 1995, Inventor: Vaughn R. Marian, Jr.

Primary Examiner—Francis J. Jaworski
Attorney, Agent, or Firm—Brinks Hofer Gilson & Lione

[57] ABSTRACT

An ultrasonic transducer assembly includes a shaft carried by the support element of the transducer assembly. This shaft supports an array of contacts that extend circumferentially around the shaft and are spaced axially along the length of the shaft. These contacts are electrically connected to conductors which are in turn connected to an ultrasonic transducer array. The shaft of the transducer assembly is received in a receptacle that includes a reciprocating slide that can be opened to insert and remove the transducer assembly from the receptacle. The slide can be closed to lock the transducer assembly in place, and to make electrical contact with the contacts of the shaft.

19 Claims, 4 Drawing Sheets

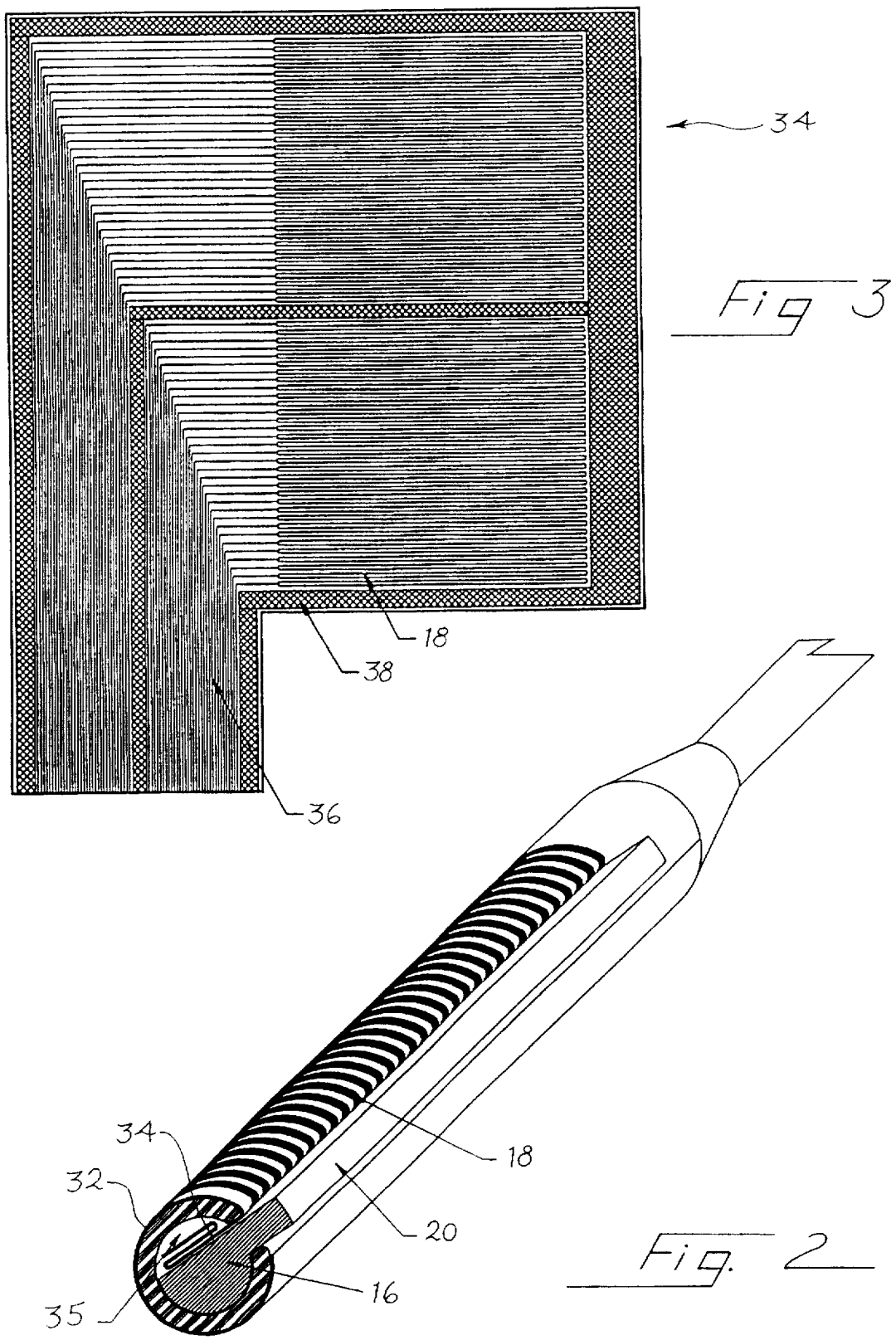

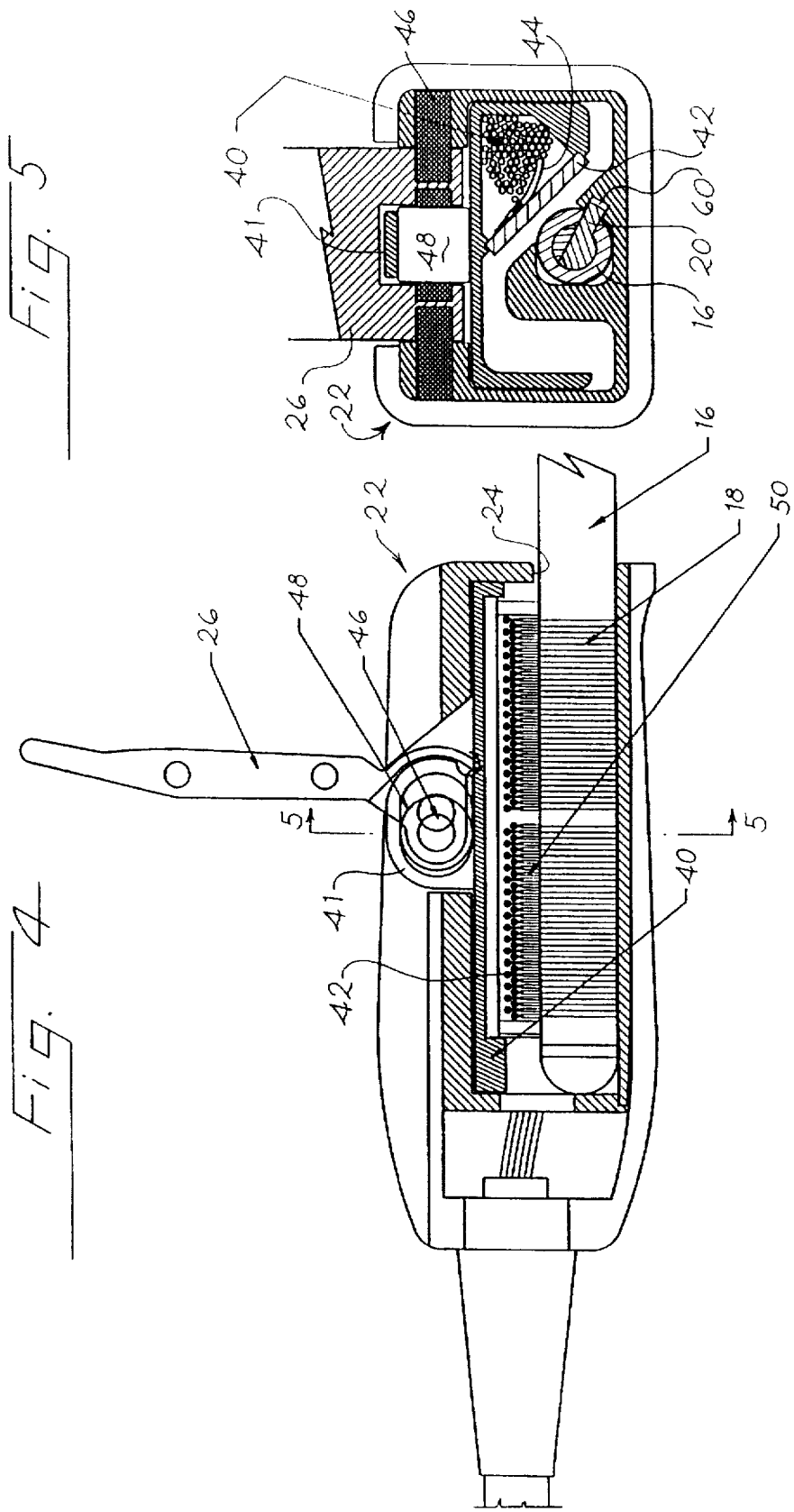

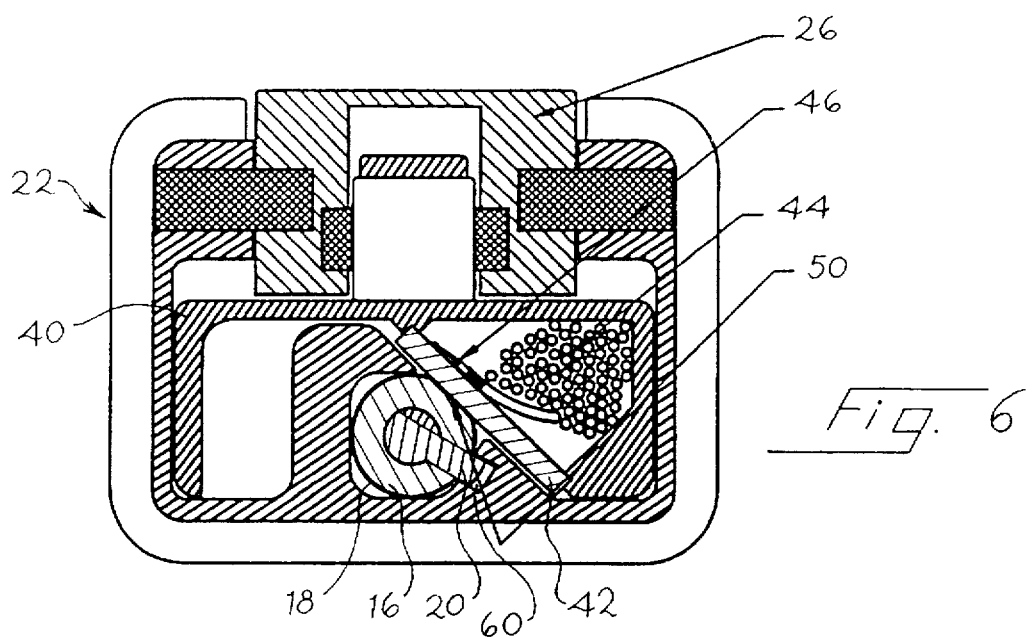
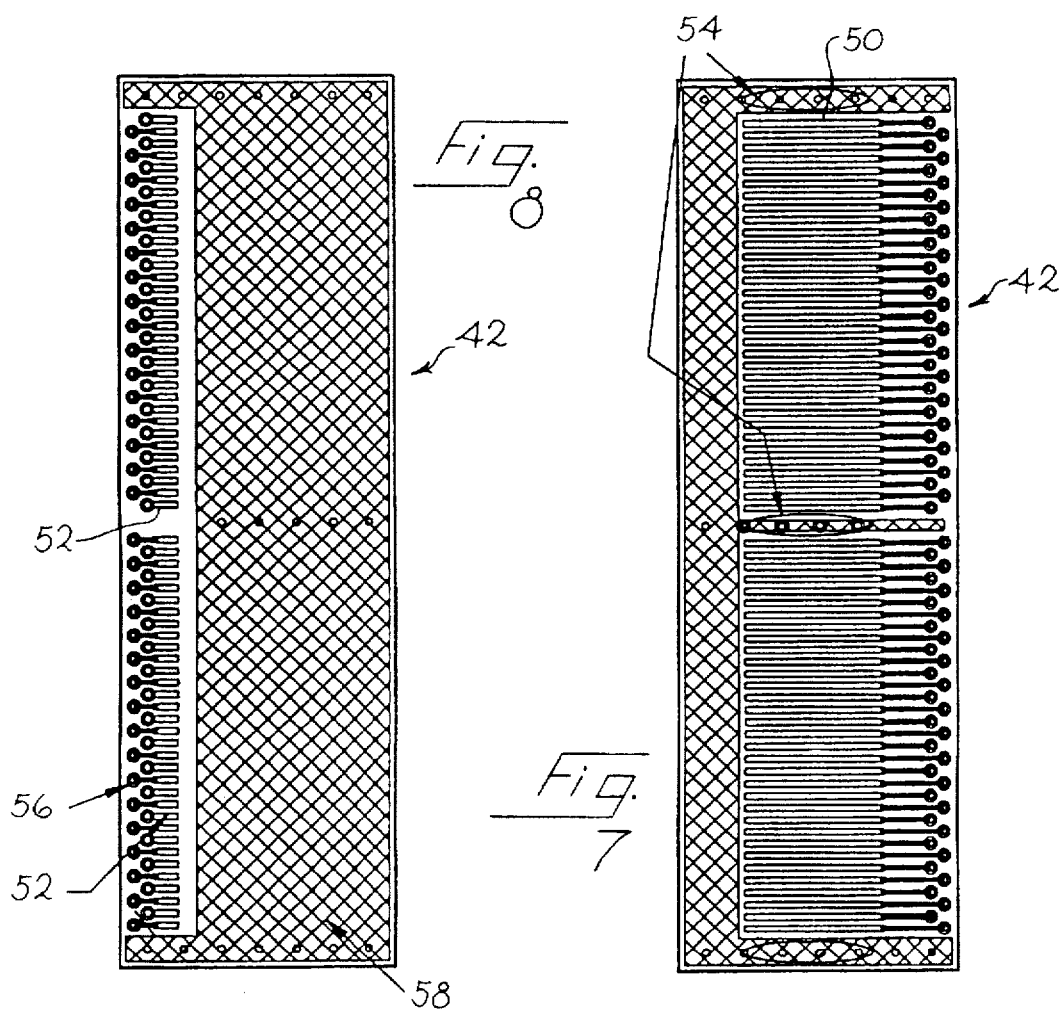

ULTRASONIC TRANSDUCER ASSEMBLY WITH IMPROVED ELECTRICAL INTERFACE

BACKGROUND OF THE INVENTION

The present invention relates to ultrasonic transducer assemblies of the type used with medical diagnostic imaging systems, and in particular to improved transducer assemblies having a low-cost electrical interconnection with the imaging system.

Conventionally, ultrasonic transducers for medical diagnostic imaging systems are expensive, one-piece assemblies that include the transducer elements, an electrical connector for connecting the transducer assembly to the ultrasonic imaging system, and a cable including a multitude of coaxial conductors interconnecting the transducers and the connector. This entire assembly is a relatively expensive component, having a cost to the user that is so high as to prevent the assembly from being considered as disposable.

For many applications, including transducer assemblies designed to be used in the bloodstream of a patient, there is a need that the ultrasound transducer be disposable. The present invention is directed to an improved electrical interface between ultrasonic transducers and the imaging system, such that the transducer assembly itself can be so low cost as to be considered disposable for many applications.

SUMMARY OF THE INVENTION

This invention relates to an ultrasonic transducer assembly of the type comprising a support element, a transducer array carried by the support element, and a plurality of conductors coupled to the transducer array and carried by the support element.

According to this invention, the support element additionally carries a shaft which defines a longitudinal axis. A plurality of contacts are provided, extending circumferentially at least partially around the shaft and spaced along the axis. At least some of the contacts are electrically coupled to respective ones of the conductors.

Preferably, both the conductors and the contacts are carried by a single flexible insulating substrate, and a resilient element is interposed between the shaft and the contacts.

This transducer assembly is designed to be connected to an ultrasonic imaging system with a receptacle that forms an opening sized to receive the shaft. This receptacle includes a slide and a contact plate mounted on the slide. The contact plate comprises a plurality of mating contacts, each positioned to engage a respective one of the contacts of the shaft.

By providing a relatively inexpensive interconnection system between the transducer assembly and the receptacle, a low-cost transducer assembly is provided that can be considered as disposable for many applications.

The invention will now be described with reference to preferred embodiments illustrated in the drawings.

BRIEF DESCRIPTION OF THE DRAWINGS

FIG. 2 is a perspective view in partial cut-away of the transducer assembly of FIG. 1.

FIG. 3 is a plan view of a part of a flexible circuit included in the transducer assembly of FIG. 1.

FIG. 4 is a longitudinal sectional view showing the transducer assembly of FIG. 1 installed in the receptacle of FIG. 1.

FIG. 5 is a cross-sectional view taken along line 5—5 of FIG. 4, showing the receptacle in an open position.

FIG. 6 is a cross-sectional view corresponding to that of FIG. 5, showing the receptacle in a closed or mated position.

FIGS. 7 and 8 are bottom and top views, respectively of the contact plate of FIGS. 5 and 6.

DETAILED DESCRIPTION OF THE PRESENTLY PREFERRED EMBODIMENTS

Figure 1:
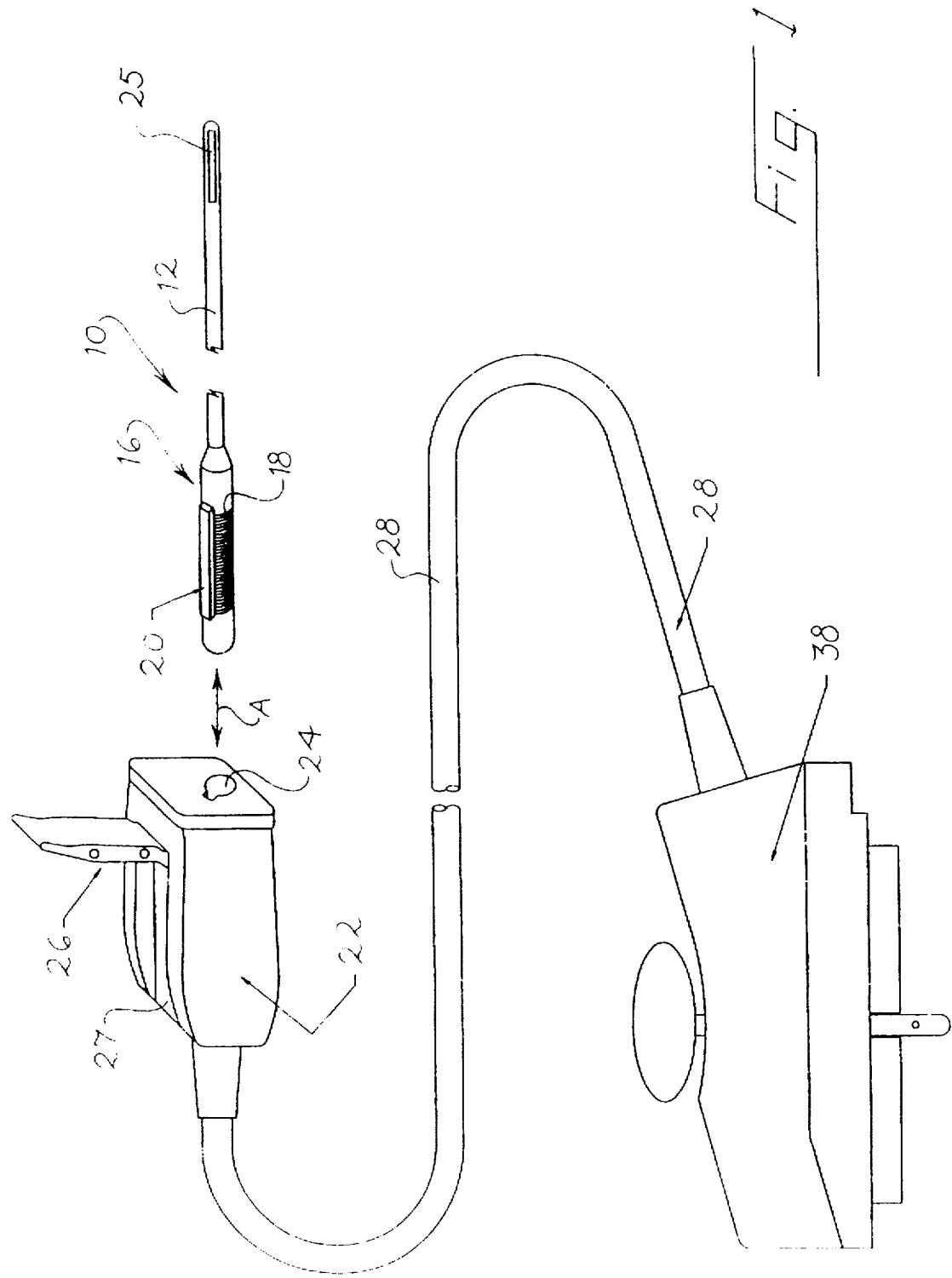
FIG. 1 is an exploded view of a transducer assembly and a receptacle which incorporate preferred embodiments of this invention.

Turning now to the drawings, FIG. 1 shows an exploded view of a transducer assembly 10 and a receptacle 22 that incorporate presently preferred embodiments of this invention.

The transducer assembly 10 includes a support element 12 that in this embodiment takes the form of an elongated catheter having a length of about 110 cm. The support element 12 carries an ultrasonic transducer array 24 on its distal end, and a shaft 16 on its proximal end. The shaft 16 carries an array of contacts or contact pads 18 that extend circumferentially around a portion of the shaft 16 and are axially spaced from one another along an axis A of the shaft 16. The shaft 16 also supports a key 20 which performs an anti-rotation function as described below.

The receptacle 22 includes an opening 24 that is sized to receive the shaft 16 and the key 20. A lever 26 is mounted on the receptacle 22 and is movable between an open position, as shown in FIG. 1, and a closed position, in which the lever 26 is received within a groove 27 of the receptacle 22. The receptacle 22 is connected via a cable 28 to a connector 38. The connector 38 is a conventional imaging system connector that connects the receptacle 22 with an ultrasonic diagnostic medical imaging system (not shown) via the cable 28. The cable 28 includes multiple coaxial conductors, as is conventional in the art.

As shown in FIG. 2, the shaft 16 and the key 20 can be integrally formed of one piece. In this embodiment the shaft 16 supports a resilient element 32 that takes the form of a compliant, elastomeric sleeve. The contact pads 18 are mounted on a flexible circuit that includes a flexible, insulating substrate 34. This insulating substrate 34 is wrapped around the resilient element 32 and is securely held in place, as for example by a suitable adhesive. The shaft 16 is shaped to provide a space 35 between the shaft 16 and the resilient element 32. This space 35 receives additional portions of the substrate 34, and the remaining volume is filled with a conventional potting material.

FIG. 3 shows a plan view of a portion of the insulating substrate 34 and the contact pads 18. Each of the contact pads 18 is integrally connected to a respective conductor 36, and the conductors 36 along with associated portions of the substrate 34 extend through the support element 12 of FIG. 1 and are electrically coupled to respective transducer elements included in the transducer array 14 of FIG. 1. In a preferred embodiment, the conductors 36 can take the form described in U.S. patent application Ser. No. 08/791,601 assigned to the assignee of the present invention. The transducer array 14 can take the form described in U.S. patent application Ser. No. 08/791,598 also assigned to the assignee of the present invention. The entire specifications of both of these applications are hereby incorporated by reference.

The substrate 34 also supports ground conductors 38 that form a large area ground return interconnecting the receptacle 22 with the transducer array 14.

As shown in FIGS. 4 and 5, when the lever 26 is in the upright, open position the shaft 16 can be inserted into the opening 24 with substantially no insertion force. The receptacle includes a slide 40 that is movable in the receptacle 22 between an open position (shown in FIGS. 4 and 5) in which the slide 40 is spaced from the shaft 16, and a closed position (shown in FIG. 6) in which the slide 40 is positioned more closely adjacent to the shaft 16.

The slide 40 supports a contact plate 42 which can be a conventional printed wiring board. The contact plate 42 is connected via coaxial conductors 44 included in the cable 28 of FIG. 1, and the contact plate 42 defines contacts or contact pads 50 on the surface adjacent to the contact pads 18.

FIGS. 7 and 8 show lower and upper sides, respectively of the contact plate 42. The lower side shown in FIG. 7 includes the contact pads 50 and a large ground return area 54. The upper side shown in FIG. 8 includes termination pads 52 and plated through holes 56 to facilitate termination of the coaxial conductors 44. The shields of the coaxial conductors are connected directly to the ground plane 58 of FIG. 8.

Returning to FIGS. 4 and 5, the lever 26 is mounted to pivot about a pivot axis 46, and the lever 26 defines a roller cam 48 that bears against an upper surface of the slide 40. When the lever 26 is moved to the open position of FIGS. 4 and 5, the slide 40 is raised by a closed extension 41 of the slide 40 that surrounds the roller cam 48. In the open position, the shaft 16 can readily be inserted into and removed from the opening 24.

After the shaft 16 has been positioned properly, as shown in FIG. 4, the lever 26 can be pivoted downwardly, thereby moving the slide 40 toward the shaft 16 until the contact pads 50 on the contact plate 46 are pressed into electrical engagement with respective ones of the contact pads 18 on the shaft 16. The contact plate 46 deforms the resilient element 32 as the plate 46 approaches its closed position. This deformation in combination with the 45° angle of the plate 46 causes the contact pads 50 to wipe across the contact pads 18, thereby enhancing reliable electrical contact. After the lever 26 has been closed, the shaft 16 is held in place in the receptacle 22 by frictional contact.

As shown in FIGS. 5 and 6, the receptacle 22 defines a slot 60 shaped to receive the key 20 and to prevent undesired rotation of the shaft 16 in the receptacle 22.

The transducer assembly described above includes a support element, with a transducer array mounted at the distal end of the support element and a shaft mounted at the proximal end. A single flexible circuit is used both to convey bi-directional electrical signals between the transducer array and the interface, and to provide electrical contact pads at the interface. These electrical contact pads at the interface are circumferentially oriented, and are spaced along the length of the shaft. This flexible circuit is also used for the ground return currents to and from the transducer array. The shaft includes a key which correctly orients the transducer assembly as it is inserted into the receptacle, and this key also prevents the shaft from rotating in use. The shaft includes a resilient element which converts an inward displacement to normal force when the receptacle is closed. Electrical interconnection is obtained between contact pads on the flexible circuit of the transducer interface and corresponding contact pads in the receptacle by mechanically pressing them together. Features are incorporated in the transducer to correctly align the transducer contact pads and corresponding contact pads of the receptacle.

The receptacle to which the transducer assembly is connected is in turn connected to a system connector via a cable having multiple coaxial conductors. The receptacle mechanically and electrically interfaces to the transducer assembly, and a lever and rotating cam are used to actuate the receptacle and to create an electrical interconnection between the contact pads of the contact plate and the contact pads of the transducer shaft. This cam imparts a linear motion to a slide included in the receptacle which supports a contact plate, that bears the receptacle contacts. This contact plate includes a printed wiring board which electrically interconnects the coaxial conductors on one side of the contact plate to the contact pads on the interface of the transducer assembly. Electrical interconnection between the receptacle and the transducer assembly is achieved when the contact plate is pressed laterally into the compliant shaft of the transducer. As the receptacle is closed, the contact plate is loaded against the compliant transducer shaft, thereby causing a radially inward distortion of the shaft.

Simply by way of example, the following details of the construction are provided in order better to define the presently preferred embodiment of this invention. In this example the stroke of the slide 40 is 0.080 inches, and the contact plate 42 compresses the resilient element 32 by about 0.025 inches when the slide 40 is in the fully locked position. When the slide 40 is in the fully raised position, there is approximately 0.033 inches of spacing between the contact pads 18 and the contact plate 42. Given the angular orientation of the contact plate 50 with respect to its line of motion and the inability of the shaft 16 to rotate within the receptacle 22, this distortion of the resilient element 32 provides a wiping action between the contact pads 18, 50 that promotes a reliable electrical interconnection. In this example the preferred spacing between the contact pads 50 is 0.020 inches and the contact pads 18, 50 are gold plated. Conventional copper traces can be used on the flexible circuit. The resilient element 32 can be formed of a material such as silicone rubber, and standard materials can be used to fabricate the flexible circuit of FIG. 3.

It should be apparent from the foregoing that a low-cost transducer assembly has been described which is well suited for applications where the transducer assembly is to be discarded after use. This low-cost transducer assembly provides a second electrical and mechanical interface near the imaging transducer. The transducer assembly includes fewer expensive components, which is important to obtaining a low-cost assembly. The use of a resilient element 32 and a flexible circuit to support the contact pads 18 results in a connector that is low in cost and therefore attractive for use in a disposable device. The system described above allows the transducer assembly 10 to be conveniently detached from the more expensive system interface components such as the connector 30, the cable 28 and the receptacle 22. By placing the interface between the transducer assembly 10 and the cable 28 as close as possible to the proximal end of the support element 12. The manufacturing cost of the disposable transducer assembly 10 is minimized.

Of course, it should be understood that many changes and modifications can be made to the preferred embodiments described above. Materials, dimensions and geometries can all be adapted as appropriate for the particular application, and the number of contact pads and associated conductors can be varied depending upon the transducer array that is used. The widest possible of variety of transducer arrays, support elements, imaging system connectors and cables can be adapted for use with this invention. It should be clearly understood that the foregoing detailed description has been intended to describe selected preferred forms that the present invention can take. It is only the following claims, including all equivalents, that are intended to define the scope of this invention.

We claim:

1. In an ultrasonic transducer assembly of the type comprising a support element, a transducer array comprising a plurality of transducer elements carried by the support element, and a plurality of conductors, each coupled to a respective transducer element of the transducer array and carried by the support element, the improvement comprising:

a shaft carried by the support element, said shaft defining a longitudinal axis;

a plurality of contacts extending circumferentially at least partially around the shaft and spaced along the axis, at least a plurality of said contacts each electrically coupled to a respective one of the conductors.

2. The invention of claim 1 wherein the contacts and at least some of the conductors are carried by a single flexible insulating substrate.

3. The invention of claim 2 wherein the insulating substrate further comprises a ground conductor.

4. The invention of claim 1 further comprising a resilient element interposed between the shaft and the contacts.

5. In an ultrasonic transducer assembly of the type comprising a support element, a transducer array carried by the support element, and a plurality of conductors coupled to the transducer array and carried by the support element, the improvement comprising:

a shaft carried by the support element, said shaft defining a longitudinal axis;

a plurality of contacts extending circumferentially at least partially around the shaft and spaced along the axis, at least a plurality of said contacts electrically coupled to respective ones of the conductors; and an anti-rotation key extending parallel to the axis and radially outwardly from the contacts.

6. In an ultrasonic transducer assembly of the type comprising a support element, a transducer array carried by the support element, the improvement comprising:

a shaft carried by the support element, said shaft defining a longitudinal axis;

a resilient element wrapped at least partly around the shaft;

a flexible circuit comprising a plurality of contacts carried by the resilient element, said contacts wrapped circumferentially partially around the shaft and spaced axially along the shaft; said flexible circuit further comprising a plurality of conductors coupled between the contacts and respective ones of the transducers, said conductors extending axially along the shaft; and an anti-rotation key coupled to the shaft and protruding radially outwardly of the contacts..

7. The invention of claim 6 wherein the flexible substrate additionally carries a ground conductor.

8. The invention of claim 5 or 6 further comprising a receptacle forming an opening sized to receive the shaft and to engage the anti-rotation key, said receptacle comprising a slide and a contact plate mounted on the slide, said contact plate comprising a plurality of mating contacts, each mating contact positioned to engage a respective one of the first-mentioned contacts.

9. The invention of claim 8 further comprising a lever-operated cam mounted to the receptacle and coupled to the slide to reciprocate the slide in the receptacle toward and away from the first-mentioned contacts.

10. The invention of claim 8 wherein the slide is movably mounted in the receptacle to move along an axis, and wherein the contact plate is oriented at an acute angle with respect to the axis.

11. The invention of claim 9 wherein the mating contacts wipe across the first-mentioned contacts as the contact plate deforms the resilient element.

12. The invention of claim 8 wherein the receptacle is electrically coupled to an imaging system connector.

13. In an ultrasonic transducer assembly of the type comprising a support element, a transducer array carried by the support element, and a plurality of conductors coupled to the transducer array and carried by the support element, the improvement comprising:

a shaft carried by the support element, said shaft defining a longitudinal axis;

a plurality of contacts extending circumferentially at least partially around the shaft and spaced along the axis, at least a plurality of said contacts electrically coupled to respective ones of the conductors;

said shaft comprising an out-of-round surface adapted to restrict rotation of the shaft in a receptacle.

14. In an ultrasonic transducer assembly of the type comprising a support element, a transducer array carried by the support element, and a plurality of conductors coupled to the transducer array and carried by the support element, the improvement comprising:

a shaft carried by the support element, said shaft defining a longitudinal axis;

a plurality of contacts extending circumferentially at least partially around the shaft and spaced along the axis, at least a plurality of said contacts electrically coupled to respective ones of the conductors; and a receptacle forming an opening sized to receive the shaft, said receptacle comprising a plurality of mating contacts, each mating contact positioned to engage a respective one of the first-mentioned contacts, said shaft being non-rotating in the receptacle in use.

15. In an ultrasonic transducer assembly of the type comprising a support element, a transducer array carried by the support element, and a plurality of conductors coupled to the transducer array and carried by the support element, the improvement comprising:

a shaft carried by the support element, said shaft defining a longitudinal axis;

a plurality of contacts extending circumferentially at least partially around the shaft and spaced along the axis, at least a plurality of said contacts electrically coupled to respective ones of the conductors; and said contacts and at least an adjacent portion of the conductors carried by a single flexible circuit.

16. In an ultrasonic transducer assembly of the type comprising a support element, a transducer array carried by the support element, and a plurality of conductors coupled to the transducer array and carried by the support element, the improvement comprising:

a shaft carried by the support element, said shaft defining a longitudinal axis;

a plurality of contacts extending circumferentially at least partially around the shaft and spaced along the axis, at least a plurality of said contacts electrically coupled to respective ones of the conductors; and a resilient element interposed between the shaft and the contacts.

17. In an ultrasonic transducer assembly of the type comprising an elongated support element which comprises an exterior surface of the transducer assembly, a transducer array carried by the support element, and a plurality of conductors coupled to the transducer array and carried by the support element, the improvement comprising:

a shaft carried by the support element, said shaft defining a longitudinal axis, said elongated support element generally aligned with the longitudinal axis such that the shaft and the support element are spaced along the axis;

a plurality of contacts extending circumferentially at least partially around the shaft and spaced along the axis, at least a plurality of said contacts electrically coupled to respective ones of the conductors.

18. The invention of claim 17 wherein the exterior surface is adapted to be used in the bloodstream of a patient.

19. The invention of claim 17 wherein the support element comprises a catheter, and wherein the transducer array and the shaft are positioned at opposite ends of the catheter.

* * * * *